(12) United States Patent
Aoki et al.

(10) Patent No.: US 7,238,298 B2
(45) Date of Patent: Jul. 3, 2007

(54) NI-CU-ZN-BASED FERRITE MATERIAL AND PROCESS FOR THE PRODUCTION THEREOF

(75) Inventors: Takuya Aoki, Tokyo (JP); Taku Murase, Tokyo (JP)

(73) Assignee: TDK Corporation, Tokyo (JP)

( * ) Notice: Subject to any disclaimer, the term of this patent is extended or adjusted under 35 U.S.C. 154(b) by 321 days.

(21) Appl. No.: 10/958,380

(22) Filed: Oct. 6, 2004

(65) Prior Publication Data

US 2005/0199851 A1 Sep. 15, 2005

(30) Foreign Application Priority Data

Oct. 6, 2003 (JP) ............... 2003-347119
Aug. 31, 2004 (JP) ............... 2004-253535

(51) Int. Cl.
*H01F 1/34* (2006.01)
*C04B 35/30* (2006.01)

(52) U.S. Cl. ............... 252/62.6; 252/62.62; 252/62.59
(58) Field of Classification Search ............... 252/62.6, 252/62.62, 62.59
See application file for complete search history.

(56) References Cited

U.S. PATENT DOCUMENTS 5,304,318 A * 4/1994 Watanabe et al. ........ 252/62.61

6,485,840 B1 * 11/2002 Ito et al. ................ 428/469
6,569,346 B1 * 5/2003 Tung et al. ............. 252/62.56

FOREIGN PATENT DOCUMENTS

| JP | 03-200303 | * | 9/1991 |
| JP | 06-84622 | * | 3/1994 |
| JP | 2000-150221 | | 5/2000 |
| JP | 2000-233967 | | 8/2000 |
| JP | 2001-44016 | | 2/2001 |
| JP | 3275466 | | 2/2002 |
| JP | 2002-141215 | | 5/2002 |
| JP | 2002-255637 | | 9/2002 |
| JP | 2004-269316 | * | 9/2004 |

OTHER PUBLICATIONS

Patent Abstracts of Japan, JP 2000-233967, Aug. 29, 2000.
Patent Abstracts of Japan, JP 2000-150221, May 30, 2000.
Patent Abstracts of Japan, JP 2000-044016, Feb. 15, 2000.
Patent Abstracts of Japan, JP 2000-255637, Sep. 19, 2000.

* cited by examiner

*Primary Examiner*—C. Melissa Koslow
(74) *Attorney, Agent, or Firm*—Oblon, Spivak, McClelland, Maier & Neustadt, P.C.

(57) ABSTRACT

An Ni—Cu—Zn-based ferrite material contains $TiO_2$ alone as an additive in an amount of 0.1 wt $\% < x \leq 4.0$ wt % in which x denotes a content of the $TiO_2$ and unavoidable impurities. The principal components thereof are 43.0 to 49.8 mol % of $Fe_2O_3$, 4.0 to 13.0 mol % of CuO, 5 to 35 mol % of ZnO and the balance of NiO.

2 Claims, 1 Drawing Sheet

NI-CU-ZN-BASED FERRITE MATERIAL AND PROCESS FOR THE PRODUCTION THEREOF

BACKGROUND OF THE INVENTION

1. Field of the Invention

The present invention relates to an Ni—Cu—Zn-based ferrite material and a process for the production thereof, and particularly to an improvement in relative resistance and Q value of the ferrite material.

2. Description of the Prior Art

With the popularization of portable devices, miniaturization of electronic devices is rapidly being promoted. A demand of further miniaturization of parts, such as laminated chip inductors, used for electronic devices is increasingly growing. A laminated chip inductor has a structure comprising a laminate of alternating magnetic ferrite layers and internal electrodes, and an external electrode electrically connected to the internal electrodes. In order to attain the small height of a laminated chip inductor, it is necessary for a magnetic ferrite layer to be made thinner. This requires the magnetic ferrite layer to have high relative resistance.

In not only laminated chip inductors, but also coiled inductors, ferrite material is required to be highly resistive. Surface-mounted type parts, such as laminated chip inductors and coiled inductors, manifest high reliability when being highly resistive. A ferrite material high in relative resistance is low in eddy electric loss and high in Q value and, therefore, development of a ferrite material high in relative resistance is highly desired in order to obtain a ferrite material having a high Q value.

To fulfill this desire, as a magnetic oxide, that high in relative resistance has to be used. Ni—Zn-based and Ni—Cu—Zn-based ferrite materials, for example, have been used because the relative resistance thereof is higher in order of magnitude than that of Mn—Zn-based ferrite material. When considering further miniaturization and reliability of laminated chip inductors and further reliability of coiled inductors, the relative resistance of Ni—Zn-based and Ni—Cu—Zn-based ferrite material has to be further enhanced.

As techniques of making Ni—Zn-based ferrite material highly resistive, there can be cited JP-A 2000-233967, Japanese Patent No. 3275466, JP-A 2000-150221, JP-A 2001-44016, JP-A 2002-141215 and JP-A 2002-255637, for example. JP-A 2000-233967 discloses a process of the production of a ferrite sinter having a magnetic permeability and a Q value enhanced with the addition of $B_4C$ and further discloses the addition of $Mn_2O_3$ to materialize a higher magnetic permeability and a higher Q value, heighten the relative resistance and prevent the insulation resistance from being lowered. In Japanese Patent No. 3275466, laminated chip parts high in strength and excellent in insulation resistance are disclosed, with an Ni—Cu—Zn-based ferrite material containing zirconium oxide as a magnetic substance. In addition, JP-A 2000-150221 discloses a low loss magnetic oxide material comprising an Ni—Zn ferrite material containing $Sb_2O_5$. Furthermore, JP-A 2001-44016 discloses an Ni—Zn-based ferrite material containing oxides of Bi and V. In these prior art references, addition of these oxides enables the high resistance of the Ni—Zn-based materials to be realized. JP-A 2002-141215 discloses an oxide magnetic material excellent in high frequency performance and high in volume resistance rate with the addition of $Bi_2O_3$ and oxide having quadrivalent positive ions and having suppressed disappearance of an internal conductor owing to diffusion of Ag that can be sintered through low temperature calcination. Moreover, disclosed in JP-A 2002-255637 is a highly relative resistant, magnetic oxide, porcelain composition having Sn, Co and Bi oxides contained in an Ni—Zn-based ferrite material.

Generally, the relative resistance is directly proportional to the sintering density, in view of which the aforementioned prior art references make attempts to add an oxide having a low melting point, such as $Bi_2O_3$, $Sb_2O_5$ or $V_2O_5$, or glass having a low melting point in order to make the relative resistance higher. However, the addition of such oxide of low melting point and such glass of low melting point is liable to induce extraordinary growth of particles in a sintered body and deterioration of magnetic characteristics thereof. These are problematic problems.

The present invention has been accomplished in consideration of the problems conventionally encountered and has as an object to provide an Ni—Cu—Zn-based ferrite material of high characteristics particularly having high relative resistance and to provide a process for the production thereof.

In order to attain the above object, the present inventors have been making keen studies repeatedly over a long period of time. As a result, they have found that the addition of $TiO_2$ enables the relative resistance to be remarkably improved, i.e. to be one-order higher or more. The present invention has been accomplished based on this knowledge.

SUMMARY OF THE INVENTION

The present invention provides an Ni—Cu—Zn-based ferrite material containing $TiO_2$ alone as an additive in an amount of 0.1 wt %<x≦4.0 wt % in which x denotes a content of the $TiO_2$ and unavoidable impurities.

The ferrite material of the present invention is, as described above, the Ni—Cu—Zn-based ferrite material that inherently has a higher relative resistance than an Mn—Zn-based ferrite material or other such ferrite material. In the present invention, the addition of $TiO_2$ that is an oxide of high melting point manifests an effect of materializing a higher relative resistance and, without producing a cause of extraordinary growth of particles or the like, also enhancing the Q characteristic.

JP-A 2002-141215 cited above, for example, discloses the addition of $TiO_2$. However, the prior art has adopted, as a premise, the addition of $Bi_2O_3$ and differs from the present invention that adds $TiO_2$ alone as an additive without addition of an oxide of low melting point, such as $Bi_2O_3$, $Sb_2O_5$ or $V_2O_5$, or glass having a low melting point. The experiments conducted by the present inventors have revealed that when adding a low melting point oxide, such as $Bi_2O_3$, the addition of $TiO_2$ fails to enable an increase of the relative resistance and lowers the magnetic permeability and Q value.

The Ni—Cu—Zn-based ferrite material of the present invention can be produced through an ordinary ferrite-producing process. To be specific, the present invention also provides a process for the production of an Ni—Cu—Zn-based ferrite material, comprising a preparation step of weighing and mixing raw oxide materials to obtain a mixture, a preliminary calcination step of preliminarily calcining the mixture to obtain a preliminarily calcined body, a pulverization step of pulverizing the preliminarily calcined body into finely pulverized particles, a granulation step of adding a binder to the finely pulverized particles to obtain a second mixture and granulating the second mixture to obtain granules, and a sintering step of shaping and sintering the granules, and further comprising an addition step of adding $TiO_2$ in an amount of 0.1 wt %<x≦4.0 wt %, in which x denotes a content of the $TiO_2$, based on the first mentioned mixture.

The $TiO_2$ can be added during the preparation step or during the pulverization step after the preliminary calcination step. In either case, an Ni—Cu—Zn-based ferrite material having a high relative resistance can be produced.

According to the present invention, it is possible to materialize an Ni—Cu—Zn-based ferrite material of high characteristics having a high relative resistance and a high Q value. Use of this material in a laminated chip inductor, for example, can further promote miniaturization of such a device.

The above and other objects, characteristic features, and advantages of the present invention will become apparent to those skilled in the art from the description to be given herein below with reference to the accompanying drawing.

DETAILED DESCRIPTION OF THE PREFERRED EMBODIMENT

Figure 1:
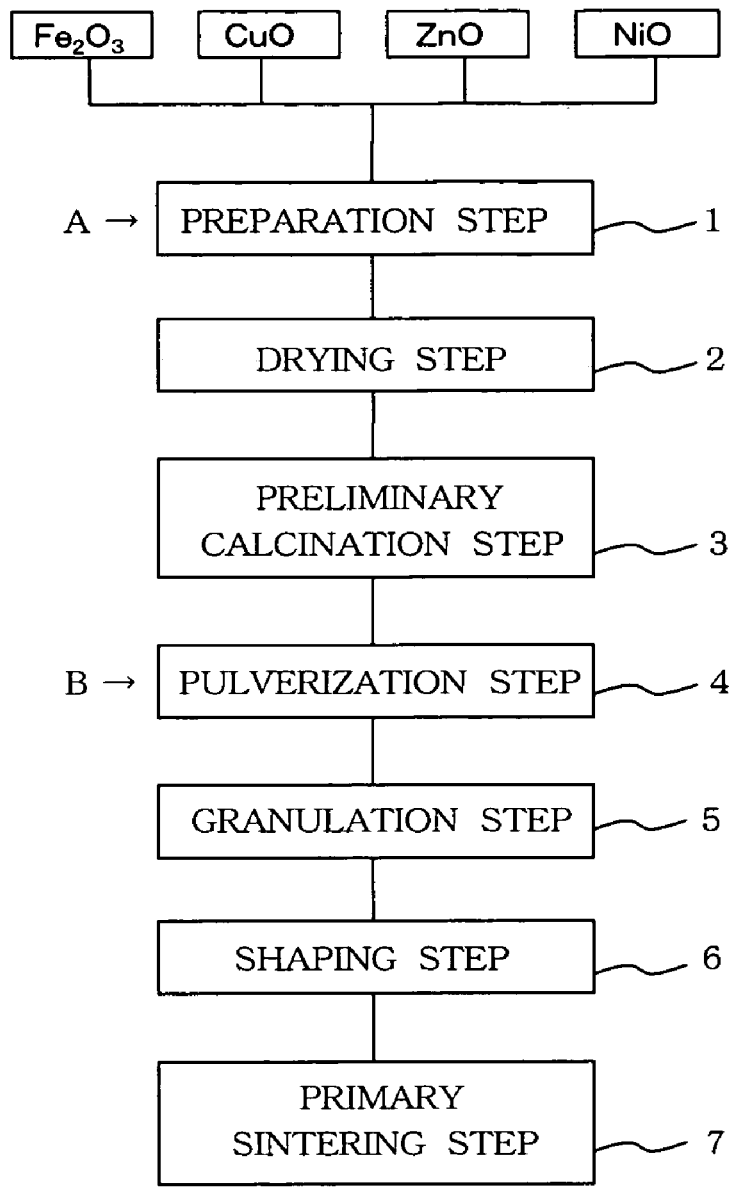
FIG. 1 is a flow chart showing a process for the production of a ferrite sinter according to the present invention.

An Ni—Cu—Zn-based ferrite material and a process for the production thereof according to the present invention will be described in detail herein below.

The ferrite material of the present invention is an Ni—Cu—Zn-based ferrite material containing as principal components $Fe_2O_3$, CuO, ZnO and NiO. While the composition of the principal components is determined in due consideration of magnetic characteristics, etc., a ferrite composition comprising 43.0 to 49.8 mol % of $Fe_2O_3$, 4.0 to 13.0 mol % of CuO, 5 to 35 mol % of ZnO and the balance of NiO, for example, manifests good magnetic characteristics including a high saturation magnetic flux density.

If the content of $Fe_2O_3$ falls short of 43.0 mol %, the shortage will result in a lack of magnetic permeability μi, whereas if it exceeds 49.8 mol %, the excess will result in a low relative resistance. This is inappropriate because the insulation property that is one of the characteristics for an Ni—Cu—Zn-based ferrite material becomes low. If the content of CuO falls short of 4.0 mol %, the shortage will result in a low sintering density, whereas it exceeds 13.0 mol %, the excess will result in a liability to induce extraordinary growth of particles. This deteriorates magnetic characteristics. If the content of ZnO falls short of 5 mol %, the shortage will result in a lack of magnetic permeability μi, whereas if it exceeds 35 mol %, the excess will result in an excessively low Curie point. Therefore, the compositions of the principal components of the ferrite material according to the present invention fall preferably in the ranges mentioned above.

In the Ni—Cu—Zn-based ferrite material according to the present invention, $TiO_2$ is added as an additive other than the principal components to demonstrate a higher relative resistance. Since $TiO_2$ added is an oxide of high melting point, an Ni—Cu—Zn-based ferrite material having high characteristics can be obtained without inducing extraordinary growth of particles and deterioration of the magnetic property in a sintered body as in the case where an oxide of low melting point or glass of low melting point is added.

When adding $TiO_2$, while the larger the amount of $TiO_2$ added, the higher the relative resistance is, in order to sufficiently enhance the relative resistance, the amount x of $TiO_2$ added is set to be preferably 0.1 wt %<x≦4.0 wt %. The amount exceeding 0.1% by weight brings about an increase in the relative resistance and an increase in the Q value. If the amount exceeds 4.0% by weight, however, the excess will induce a tendency to lower the relative resistance and possibly lower the magnetic properties, particularly the magnetic permeability. The amount of $TiO_2$ added is more preferably in the range of 0.2 wt % to 4.0 wt % and further preferably in the range of 1.0 wt % to 4.0 wt %.

When adding $TiO_2$, it is important to add $TiO_2$ alone as an additive premising no addition of an oxide of low melting point, such as $Bi_2O_3$, $Sb_2O_5$, $V_2O_5$, etc., or glass of low melting point. As described earlier, addition of an oxide of low melting point or glass of low melting point readily induces extraordinary growth of particles and deterioration of the magnetic property in a sintered body. Actually, even when adding such oxide or glass as having a low melting point and $TiO_2$ together as additives, an increase in the relative resistance cannot be expected, and rather there is a possibility of the magnetic permeability and Q value being lowered.

The ferrite material mentioned above, such as a ferrite sinter, is fundamentally produced in the same manner as in the production process of an ordinary ferrite sinter. The production process of a ferrite sinter is shown in FIG. 1. The process will be described specifically. Raw oxide materials are mixed at a preparation step 1 to obtain a mixture. Wet blending using a ball mill, for example, is adopted. The mixture is then subjected to a drying step 2 and preliminarily calcined at a preliminary calcination step 3. This preliminary calcination is conducted in an atmospheric atmosphere at a retention temperature of 700° C. to 950° C. The preliminarily calcined mixture is then finely pulverized at a pulverization step 4 to obtain finely pulverized particles. The finely pulverized particles comprising principal components and an additive are desirably granulated at a granulation step 5 into granules in order to smoothly promote a subsequent shaping step 6. The granules can be obtained by adding polyvinyl alcohol to slurry of the finely pulverized particles, and the resultant is sprayed and dried using a spray dryer. Finally, the dried material is shaped into a desired shape at a shaping step 6, and the shaped material is primarily sintered at a sintering step 7. The primary sintering is performed in an atmospheric atmosphere at a retention temperature of 900° C. to 1100° C.

$TiO_2$ is added either at the first step of the production process, i.e. the preparation step 1 (indicated by "A" in FIG. 1), or at the pulverization step 4 (indicated by "B" in FIG. 1) after the preliminary calcination step 3. In either case, the effects of the addition of $TiO_2$ (enhancement of the relative resistance and Q value) can be manifested.

The Ni—Cu—Zn-based ferrite material according to the present invention has a high relative resistance. It is therefore advantageously used for an electronic part, such as a laminated chip inductor. With this, the ferrite material is made thinner to suppress the height of the part, thereby attaining miniaturization. When using the ferrite material for a laminated chip inductor, the finely pulverized particles obtained at the pulverization step after the preliminary calcination step in the production process mentioned above are used to produce green sheets, and laminated green sheets are primarily sintered.

The present invention will be described in detail below with reference to concrete examples based on the experimental results.

Ferrite sinter specimens 1 to 9 were produced through the following procedure. $Fe_2O_3$, CuO, ZnO, NiO and $TiO_2$ were weighed into a mass having predetermined ratios. The mass was added with ion exchange water and then mixed for 16 hours using a ball mill. The fundamental composition comprises 46.0 mol % of $Fe_2O_3$, 20.5 mol % of NiO, 10.8 mol % of CuO, and 22.7 mol % of ZnO.

The mixed powder was preliminarily calcined in a heating furnace for 2 hours at a maximum temperature of 800° C. and then furnace cooled. The resultant mixture was crushed using a 30-mesh sieve, then added again with a predetermined amount of ion exchange water as a solvent and finely pulverized using a ball mill.

Slurry of the finely pulverized particles was added with an aqueous polyvinyl alcohol solution and granulated to ferrite granules. The ferrite granules were shaped into a toroidal shape having an outside diameter of 13 mm, an inside diameter of 6 mm and a thickness of 3 mm. The shaped ferrite body was sintered in a furnace at a sintering temperature of 900° C. to obtain a ferrite sinter.

In accordance with the aforementioned procedure, samples (specimens 1 to 8) were produced with the amount of $TiO_2$ varied. In view of the fact that the magnetic property is not so deteriorated if the amount of $Fe_2O_3$ added is made small even when the amount of $TiO_2$ added is increased, in producing specimens 7 and 8, the amounts of $Fe_2O_3$ and ZnO added were set to be 44.0 mol % and 24.7 mol %, respectively. In producing specimen 9, $Bi_2O_3$ was added as an additive in addition to the composition of specimen 6. Therefore, specimen 6 corresponds to a comparative example.

Ferrite sinter specimens 10 to 13 were produced in accordance with the same procedure as in producing specimens 1 to 9 except for a fundamental composition comprising 48.0 mol % of $Fe_2O_3$, 19.6 mol % of NiO, 10.7 mol % of CuO and 21.7 mol % of ZnO. Samples (specimens 10 to 12) were produced, with the amount of $TiO_2$ varied. In producing specimen 13, $Bi_2O_3$ that is an oxide of low melting point was added as an additive in addition to the composition of specimen 12. Therefore, specimen 13 corresponds to a comparative example.

Ferrite sinter specimens 14 to 16 were produced in accordance with the same procedure as in producing specimens 1 to 9 except for a fundamental composition comprising 49.0 mol % of $Fe_2O_3$, 10.7 mol % of NiO, 10.5 mol % of CuO and 29.8 mol % of ZnO. In producing specimen 14, no $TiO_2$ was added, whereas $TiO_2$ was added in producing specimen 15. In producing specimen 16, $Bi_2O_3$ that is an oxide of low melting point was added as an additive in addition to the composition of specimen 14. Therefore, specimen 16 corresponds to a comparative example.

Ferrite sinter specimens 17 and 18 were produced in accordance with the same procedure as in producing specimens 1 to 9 using the same composition as that of specimen 5 and adding $TiO_2$ at the pulverization step. In producing specimen 18, $Bi_2O_3$ that is an oxide of low melting point was added as an additive in addition to the composition of specimen 17. Therefore, specimen 16 corresponds to a comparative example.

A wire was coiled around each ferrite sinter of toroidal shape 20 times, and an impedance analyzer was used to measure the magnetic permeability μi at a measurement frequency of 100 kHz and the Q value at a measurement frequency of 1 MHz of the ferrite sinter. The ferrite sinter was formed with a pair of opposed electrodes between which a voltage of 25 V was applied to measure the insulation resistance thereof and calculate the relative resistance thereof.

The magnetic permeability μi, relative resistance and Q value of each ferrite sinter were measured as described above. The results thereof are shown in Table 1 below, in which the specimens corresponding to the examples of the present invention are marked with asterisks.

TABLE 1

| Specimen Number | (mol %) | | | | (wt %) | | μi | Ω · m Relative Resistance | (1 MHz) Q value |
|---|---|---|---|---|---|---|---|---|---|
| | $Fe_2O_3$ | NiO | CuO | ZnO | $TiO_2$ | $Bi_2O_3$ | | | |
| 1 | 46.0 | 20.5 | 10.8 | 22.7 | 0.00 | 0.00 | 136 | 1.87E+05 | 63 |
| 2 | 46.0 | 20.5 | 10.8 | 22.7 | 0.10 | 0.00 | 137 | 4.07E+05 | 71 |
| *3 | 46.0 | 20.5 | 10.8 | 22.7 | 0.20 | 0.00 | 139 | 1.09E+06 | 75 |
| *4 | 46.0 | 20.5 | 10.8 | 22.7 | 1.00 | 0.00 | 145 | 1.11E+07 | 95 |
| *5 | 46.0 | 20.5 | 10.8 | 22.7 | 2.00 | 0.00 | 154 | 8.76E+08 | 122 |
| *6 | 46.0 | 20.5 | 10.8 | 22.7 | 2.60 | 0.00 | 160 | 8.71E+09 | 136 |
| *7 | 44.0 | 20.5 | 10.8 | 24.7 | 3.80 | 0.00 | 142 | 8.51E+09 | 123 |
| 8 | 44.0 | 20.5 | 10.8 | 24.7 | 4.20 | 0.00 | 48 | 6.61E+04 | 76 |
| 9 | 46.0 | 20.5 | 10.8 | 22.7 | 2.60 | 1.00 | 103 | 6.76E+07 | 39 |
| 10 | 48.0 | 19.6 | 10.7 | 21.7 | 0.00 | 0.00 | 281 | 1.33E+08 | 83 |
| *11 | 48.0 | 19.6 | 10.7 | 21.7 | 0.20 | 0.00 | 286 | 1.65E+09 | 90 |
| *12 | 48.0 | 19.6 | 10.7 | 21.7 | 1.30 | 0.00 | 291 | 8.62E+09 | 98 |
| 13 | 48.0 | 19.6 | 10.7 | 21.7 | 1.30 | 1.00 | 122 | 2.67E+07 | 36 |
| 14 | 49.0 | 10.7 | 10.5 | 29.8 | 0.00 | 0.00 | 673 | 8.14E+08 | 38 |
| *15 | 49.0 | 10.7 | 10.5 | 29.8 | 0.20 | 0.00 | 691 | 6.68E+09 | 49 |
| 16 | 49.0 | 10.7 | 10.5 | 29.8 | 0.20 | 1.00 | 315 | 8.36E+07 | 19 |
| 17 | 46.0 | 20.5 | 10.8 | 22.7 | 2.00 | 0.00 | 151 | 8.96E+08 | 119 |
| *18 | 46.0 | 20.5 | 10.8 | 22.7 | 2.00 | 1.00 | 96 | 3.21E+06 | 33 |

As is clear from Table 1 above, the addition of $TiO_2$ in an amount exceeding 0.1% by weight increases the relative resistance and Q value (specimens 3 to 7, 11, 12, 15 and 17). Table 1 has revealed the following. As regards the relative resistance in particular, samples with the addition of $TiO_2$ in an amount of 0.2 wt % to 4.0 wt % (specimens 3 to 7, 11, 12, 15 and 17) attain extremely high relative resistance on the order of $10^6$ to $10^9$. When the amount of $TiO_2$ added exceeds 4.0% by weight (specimen 8), however, the relative resistance is lowered and the magnetic property, particularly the magnetic permeability, is also lowered. In each of specimens 1, 10 and 14 with no $TiO_2$ added, the relative resistance, magnetic permeability μi and Q value are lower than those of the specimen of the same composition with $TiO_2$ added. Furthermore, in each of specimens 9, 13, 16 and 18 having $Bi_2O_3$ that is an oxide of low melting point added as an additive in addition to $TiO_2$, the relative resistance is not increased (is rather decreased), and the magnetic permeability and Q value are lowered to a great extent.

What is claimed is:

1. A Ni—Cu—Zn-based ferrite material consisting of principal components and 1.0 to 4.0 wt % of $TiO_2$ alone as an additive except for unavoidable impurities, wherein the principal components consist of 43.0 to 49.8 mol % of $Fe_2O_3$, 4.0 to 13.0 mol % of CuO, 5 to 35 mol % of ZnO and the balance of NiO.

2. A process for the production of a Ni—Cu—Zn-based ferrite material according to claim 1, comprising a preparation step of weighing and mixing raw oxide materials to obtain a mixture;

a preliminary calcination step of preliminarily calcining the mixture to obtain a preliminarily calcined body;

a pulverization step of pulverizing the preliminarily calcined body into finely pulverized particles;

an addition step of adding $TiO_2$ in an amount of 1.0 wt %$\leq$x$\leq$4.0 wt %, in which x denotes a content of the $TiO_2$, based on the mixture, which step is taken during the preparation step or pulverization step;

a granulation step of adding a binder to the finely pulverized particles to obtain a second mixture and granulating the second mixture to obtain granules; and a sintering step of shaping and sintering the granules.

* * * * *